United States Patent
Chiappe et al.

(10) Patent No.: US 6,492,880 B1
(45) Date of Patent: Dec. 10, 2002

(54) COMMON MODE TERMINATION

(75) Inventors: Jim Chiappe, Fremont, CA (US); Dean Wood, Campbell, CA (US); Mehran Ataee, Cupertino, CA (US); Meilissa Lum, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 93 days.

(21) Appl. No.: 09/803,610

(22) Filed: Feb. 21, 2001

(51) Int. Cl.[7] ................................................. H01P 1/24
(52) U.S. Cl. ..................... 333/22 R; 333/24 R; 333/32; 333/5; 375/258; 379/398
(58) Field of Search ............................... 333/4, 5, 24 R, 333/181, 12, 22 R, 32; 375/258; 379/398

(56) References Cited

U.S. PATENT DOCUMENTS 5,896,417 A * 4/1999 Lau ............................. 375/258

* cited by examiner

*Primary Examiner*—Robert Pascal
*Assistant Examiner*—Stephen E. Jones
(74) *Attorney, Agent, or Firm*—Jay A. Chesavage

(57) ABSTRACT

A common mode termination includes a shielded connector, a receive section and a transmit section, each section comprising an isolation transformer, a common mode transformer, a reference autotransformer, and an AC shield return. Each transmit section reference autotransformer and receive section reference autotransformer has a center tap for the application of a bias voltage and a bias voltage return. The bias voltage is fed through a common mode transformer, and the resultant common mode termination reduces the conduction of EMI from the serdes coupled to the common mode termination to cables connected to the connector. This common mode termination also provides a reference termination for the copper twisted pair cable and reduces resonances on the cable. Finally, this termination also provides filtering on the DC power source wires and improves noise immunity from transients coupled onto the twisted pair cable into the system.

18 Claims, 2 Drawing Sheets

COMMON MODE TERMINATION

FIELD OF THE INVENTION

The current invention is directed to the delivery of a bias voltage using a pair of differential signals while it minimizing the electromagnetic interference produced by these differential mode signals in an Ethernet data port or other serial data port where a common mode transformer is employed for high potential (hipot) isolation.

BACKGROUND OF THE INVENTION

Isolation transformers and common mode transformers are commonly used in the serial interface ports in communications equipment. One such serial interface type is Ethernet, as described in IEEE standard 802.3. In this type of communications interface, it is desired to transmit differential mode voltages over long distances to a remote point, and a pair of differential transmit signals and a pair of differential receive signals are sent over twisted pair copper wire. The data rate carried over these differential pairs varies from a data rate of 10 Mbps (million bits per second) to a data rate in excess of 1 Gbps. It is often desired to reduce the high frequency common mode component of the transmitted signal, and a class of transformers known as common mode transformers is employed, whereby the opposing flux produced by common mode currents cancels the common mode voltage at the output of the transformer, while the additive flux produced by differential mode currents reinforces the output voltage. In addition, an isolation voltage requirement provides for the biasing 1500V of DC from any differential pair to ground, and an isolation transformer is commonly employed to provide this isolation. FIG. 1 shows one such prior art termination. A device known as a SERDES (serializer-deserializer) provides a serial stream of differential output data on lines 41 and 41', which couples to transmitter isolation transformer 14 of transformer 12. Isolation transformer 12 serves to provide the required hipot (high potential) isolation of typically 1500V between the data equipment associated with the serdes 40, and the incoming data lines of connector 30. Transmit isolation transformer 14 is followed by common mode transmit transformer 20 of common mode transformer 18. A common mode transformer provides very little impedance to currents of opposite polarity, and a higher impedance to currents of the same polarity, thereby reducing the conduction of high frequency currents from the serdes 40 to the external conductors of the cables attached to connector 30. This reduction in common mode transfer from the serdes to the connector conductors reduces the emissions of EMI (Electro-Magnetic Interference) from the equipment. A balancing transformer 26 provides for symmetry in the output voltages, as well as an impedance reference for the common mode transformer 20. The output of transmit common mode transformer 20 is also furnished to an output connector 30, which for Ethernet is pins 1 and 2 of a shielded RJ-45 connector. Similarly, the receive path comprises a differential input arriving on connector 30 pins 3 & 6, thereafter being furnished to common mode receive transformer 22 of common mode transformer 18, and to receive isolation transformer 16 of isolation transformer 12, and to the receive inputs 43 and 43' of the deserializer section of serdes 40. Receive balancing transformer 28 of balancing transformer 24 provides an impedance reference for common mode choke 22, as before. The reference resistors 42 and 44 provide an impedance reference for the unbalanced voltages present in the center tap of the balancing transformers 26 and 28. Capacitor 50 is a high voltage type that provides an AC return path for unbalanced common mode currents generated by either receive balancing tranformer 28 or transmit balancing tranformer 26. Resistors 46 and 48 provide a high frequency termination for unused pins 4, 5, 7, and 8 of the RJ-45 connector 30, for the case where an 8 wire cable using 2 pairs of twisted pair conductors is employed. As the cable connected to connector 30 may be very long, common mode voltages appearing on the twisted pairs for transmit and receive capacitively couple to the other twisted pairs, so all wires of the cable are provided a high frequency reference to ground, including the unused pins 4, 5, 7, and 8.

OBJECTS OF THE INVENTION

A first object of the invention is to provide a bias voltage using two differential pair electrical connections while preserving the hipot characteristics of the prior art termination. A second object of the invention is to provide an operating voltage over two differential pair electrical connections while preserving the common mode EMI attenuation of the prior art termination. A third object of the invention is to couple residual transient noise energy on the twisted pair cables to a shield conductor.

SUMMARY OF THE INVENTION

A differential mode termination includes a transmit isolation transformer coupled to a transmit common mode transformer, which is coupled to an output connector. The transmit common mode transformer has a reference autotransformer with a center tap for providing a shield reference, as well as the application of a bias voltage. The differential mode termination also includes a receive isolation transformer coupled to a receive common mode transformer, which is coupled to an output connector. The receive common mode transformer is coupled to a reference autotransformer with a center tap for providing a shield reference to the common mode transformer. By providing a bias voltage to the transmit reference autotransformer center tap and a bias voltage return to the center tap of the receive reference autotransformer, it is possible to power remote equipment while minimizing common mode coupling of EMI from the serdes and other noise sources internal to the equipment to the conductors of cables attached to the output connector.

DETAILED DESCRIPTION OF THE INVENTION

Figure 1:
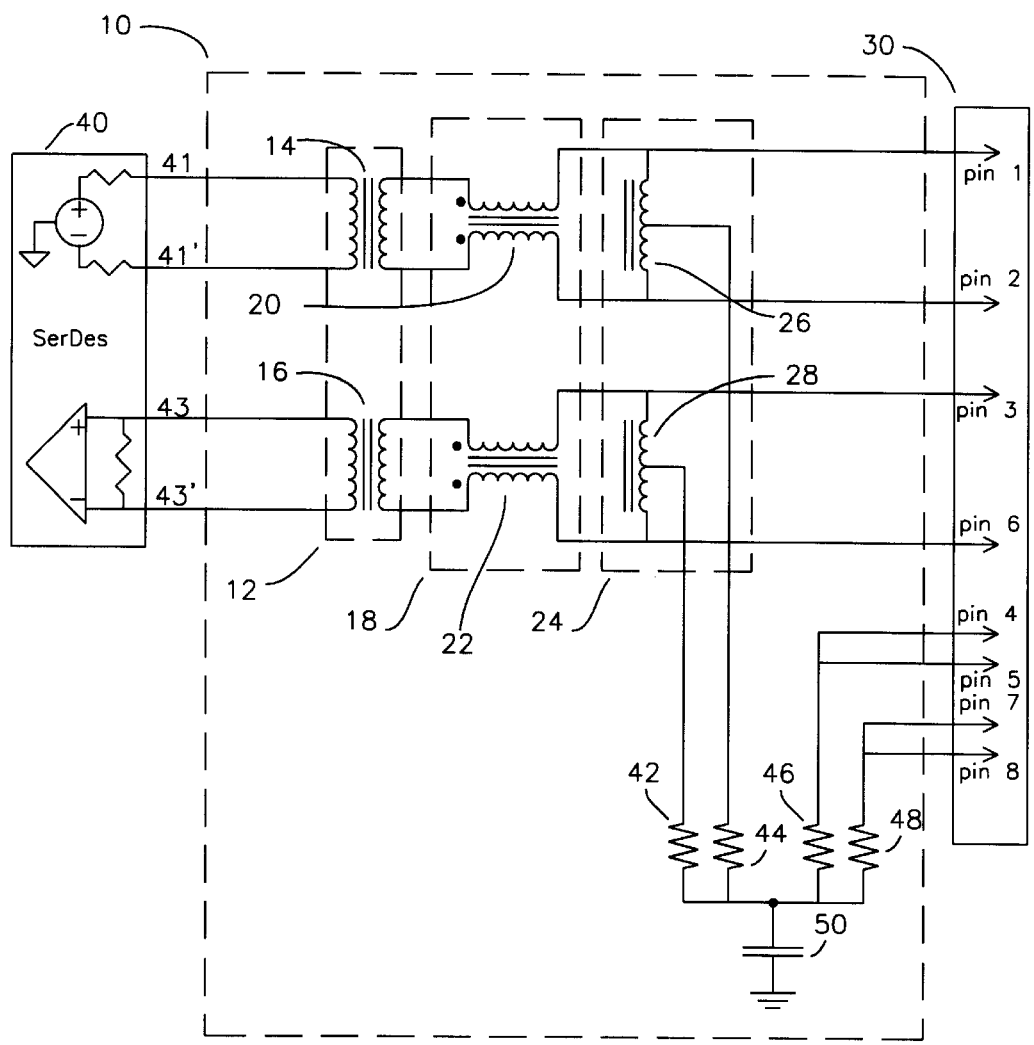
FIG. 1 is a schematic diagram for a prior art isolating termination with common mode transformers.
Figure 2:
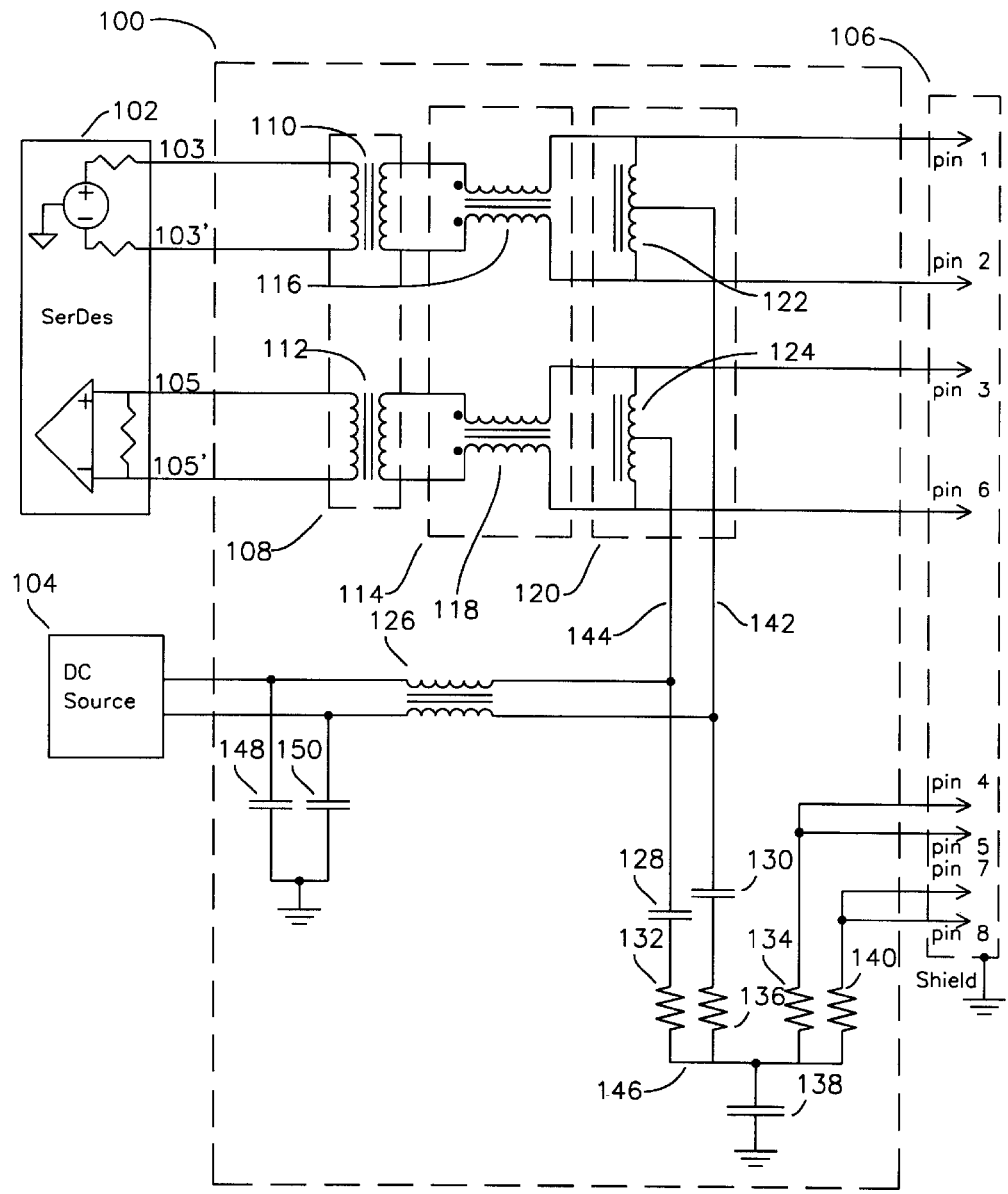
FIG. 2 is a schematic diagram for an isolating termination with common mode transformers which also provides a bias voltage.

FIG. 2 shows a serdes 102 which provides a first output voltage 103, and a voltage 103' of equal magnitude and opposite polarity. This differential voltage is provided to the primary side of an isolation transformer 110, which may be a 1:1 turns ratio, or any other turns ratio which provides for DC voltage isolation from primary to secondary. The secondary side of the transmit isolation transformer 110 is connected to the input side of transmit common mode transformer 116. The output side of common mode transformer 116 is connected to the output terminals of the shielded connector 106, and to a reference autotransformer 122 which has a center tap conductor 142, which is referenced to the shield of the connector 106 through AC termination network comprising capacitor 130 in series with resistor 136.

The receive channel includes connections to the shielded connector 30, which provide differential voltages to receive reference autotransformer 124, which provides a symmetric center voltage reference for the incoming differential pair voltage from connector 106. This differential voltage is provided to the output side of receive common mode transformer 118, which filters common mode signals generated by the serdes 102 that would otherwise appear as EMI. on the conductors of connector 106. The input side of receive common mode transformer 118 is connected to the secondary side of receive isolation transformer 112, which provides hipot isolation from the secondary side to the primary side of the isolation transformer 112 connected to the receive section of the serdes 102 differential input signals 105 and 105'. As before, the turns ratio of the isolation transformer 112 could be any value which enables coupling of signals from input to output while preserving the impedance and signal integrity of the transformed signals. The primary side of the isolation transformer is coupled to the serdes terminals 105, and 105', which convert the differential voltage disposed therein to a serial stream of data for further processing by the data equipment associated with the serdes 102. Receive reference autotransformer 124 includes a center tap conductor 144, which is referenced to the shield of the connector 106 through an impedance network comprising a capacitor 128 and a resistor 132 coupled to an AC shield node 146. The AC shield node 146 is coupled to the shield of connector 106 through high frequency capacitor 138. The unused pins of connector 106 are also connected to the AC shield node 146 through dissipation resistors 134 and 140. Common mode voltages appearing on the conductors of the cable terminated in connector 106 are returned to the shield of the cable through the network formed by capacitors 128 and 130, and the resistors 132, 136, 134, and 140. A DC source 104 provides a voltage applied between the center tap of receive autotransformer 122 and the center tap of transmit autotransformer 124. Common mode inductor 126 attenuates high frequency signals which would otherwise be conducted out of connector 106. The DC source 104 may be an isolated supply which is compatible with the application of hipot voltages on the signals of connector 106, or it may be a standard ground-referenced supply, as is known to one skilled in the art. Bias voltage common mode filter capacitors 148 and 150 are located between the DC source 104 and the common mode transformer 126. Capacitors 148 and 150 couple high frequency common mode signals coupled from power supply common mode transformer 126 to shield return. If the voltage source 104 is a hipot isolated type, then capacitors 148 and 150 are high voltage capacitors capable of withstanding the hipot potential. For high speed induced line voltages applied to the conductors of connector 106, such as those produced by IEC 1000-4-4 EFTB test for European CE compliance, capacitors 148 and 150 return high frequency transient noise to ground, preventing upset on turn-on circuitry in the DC power source 104.

We claim:

1. A common mode termination comprising:
   a differential voltage transmitter having a transmitter differential output;
   a transmit isolation transformer having a primary and a secondary, said transmit isolation transformer primary coupled to said transmitter differential output;
   a transmit common mode transformer having an input and an output, said transmit common mode transformer input coupled to said transmit isolation transformer secondary;
   a transmit reference autotransformer having an output, a compliment output, and a center tap, said transmit reference transformer output and compliment output coupled to said common mode transformer output;
   a shielded connector having at least two pins for a line output, said pins coupled to said transmit common mode transformer;
   a differential voltage receiver having a receiver differential input;
   a receive isolation transformer having a primary and a secondary, said receive isolation transformer primary coupled to said receive differential input;
   a receive common mode transformer having an input and an output, said input coupled to said receive isolation transformer secondary;
   a receive reference autotransformer having an output, a compliment output, and a center tap, said receive reference transformer output and compliment output coupled to said receive common mode transformer output;
   a shielded connector having at least two pins for a line input, said pins coupled to said receive common mode transformer;
   a voltage source common mode transformer having an input and an output,.said common mode transformer output coupled to said transmit reference autotransformer center tap and said receive reference autotransformer center tap;
   a voltage source having an output and a return, said voltage source output coupled to said voltage source common mode transformer input.

2. The termination of claim 1 wherein said voltage source is isolated from said shield.

3. The termination of claim 1 wherein said transmit reference autotransformer center tap is referenced to an AC ground, and said AC ground is referenced to said connector shield through a capacitor.

4. The termination of claim 3 wherein said transmit reference autotransformer center tap is referenced to said AC ground through a series resistor and capacitor.

5. The termination of claim 1 wherein said receive reference autotransformer center tap is referenced to an AC ground, and said AC ground is referenced to said connector shield through a capacitor.

6. The termination of claim 5 wherein said receive reference autotransformer center tap is referenced to said AC ground through a series resistor and capacitor.

7. The termination of claim 3 or claim 5 wherein the unused conductors of said shielded connector are referenced to said AC ground through a series resistor and capacitor.

8. The termination of claim 3 or claim 5 wherein a t least one unused conductor of said shielded connector are referenced to said AC ground through a series resistor and capacitor.

9. The termination of claim 3 or wherein said voltage source has a value of 0 or more volts.

10. A common mode termination comprising:
    a differential voltage transmitter having a transmitter differential output;
    a transmit isolation transformer having a primary and a secondary, said transmit isolation transformer primary coupled to said transmitter differential output;

a transmit common mode transformer having an input and an output, said transmit common mode transformer input coupled to said transmit isolation transformer secondary;

a transmit reference autotransformer having an output, a compliment output, and a center tap, said transmit reference transformer output and compliment output coupled to said common mode transformer output;

a shielded connector having at least two pins for a line output, said pins coupled to said transmit common mode transformer;

a differential voltage receiver having a receiver differential input;

a receive isolation transformer having a primary and a secondary, said receive isolation transformer primary coupled to said receive differential input;

a receive common mode transformer having an input and an output, said input coupled to said receive isolation transformer secondary;

a receive reference autotransformer having an output,. a compliment output, and a center tap, said receive reference transformer output and compliment output coupled to said receive common mode transformer output;

a shielded connector having at least two pins for a line input, said pins coupled to said receive common mode transformer;

a voltage source common mode transformer having an input and an output, said common mode transformer output coupled to said transmit reference autotransformer center tap and said receive reference autotransformer center tap;

a voltage source having an output and a return, said voltage source output coupled to said voltage source common mode transformer input;

a first coupling capacitor coupled from said voltage source output to said shield;

a second coupling capacitor coupled from said voltage source return to said shield.

11. The termination of claim 10 wherein said voltage source is isolated from said shield.

12. The termination of claim 10 wherein said transmit reference autotransformer center tap is referenced to an AC ground, and said AC ground is referenced to said connector shield through a capacitor.

13. The termination of claim 12 wherein said transmit reference autotransformer center tap is referenced to said AC ground through a series resistor and capacitor.

14. The termination of claim 10 wherein said receive reference autotransformer center tap is referenced to an AC ground, and said AC ground is referenced to said connector shield through a capacitor.

15. The termination of claim 14 wherein said receive reference autotransformer center tap is referenced to said AC ground through a series resistor and capacitor.

16. The termination of claim 14 or claim wherein the unused conductors of said shielded connector are referenced to said AC ground through a series resistor and capacitor.

17. The termination of claim 12 or claim 14 wherein at least one unused conductor of said shielded connector are referenced to said AC ground through a series resistor and capacitor.

18. The termination of claim 12 or 14 wherein said voltage source has a value of 0 or more volts.

* * * * *